US008233468B2

(12) United States Patent
Yang et al.

(10) Patent No.: US 8,233,468 B2
(45) Date of Patent: Jul. 31, 2012

(54) PROBABILITY TIME DIVISION MULTIPLEXING POLLING METHOD AND WIRELESS IDENTIFIER READER CONTROLLER THEREOF

(75) Inventors: Tsu-Kuang Yang, Taichung County (TW); Jen-Yau Kuo, Hsinchu (TW); Tung-Hung Lu, Yilan County (TW); Kuo-Shu Luo, Hsinchu (TW); Li-Dien Fu, Kinmen County (TW); Min-Hsien Weng, Taichung County (TW); Chih-Wei Chao, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 459 days.

(21) Appl. No.: 12/491,256

(22) Filed: Jun. 25, 2009

(65) Prior Publication Data

US 2010/0303056 A1 Dec. 2, 2010

(30) Foreign Application Priority Data

May 26, 2009 (TW) .............................. 98117447 A

(51) Int. Cl.
*H04J 3/16* (2006.01)

(52) U.S. Cl. .................................... 370/346; 340/572.1

(58) Field of Classification Search .......... 370/328–329, 370/331–332, 346–348, 437, 442–444, 449; 340/572.1–572.2, 572.4
See application file for complete search history.

(56) References Cited

U.S. PATENT DOCUMENTS

| | | | | |
|---|---|---|---|---|
| 7,568,211 | B2 * | 7/2009 | Mai et al. | 725/35 |
| 8,040,829 | B2 * | 10/2011 | Wood, Jr. | 370/312 |
| 2004/0179547 | A1 * | 9/2004 | Kuffner et al. | 370/465 |
| 2007/0126634 | A1 * | 6/2007 | Bye | 342/451 |
| 2008/0074238 | A1 * | 3/2008 | Kodialam et al. | 340/10.2 |
| 2008/0094182 | A1 * | 4/2008 | Sugano et al. | 340/10.5 |
| 2008/0186136 | A1 * | 8/2008 | Raphaeli et al. | 340/10.1 |
| 2010/0148931 | A1 * | 6/2010 | Pappu et al. | 340/10.2 |
| 2010/0156599 | A1 * | 6/2010 | Ainsbury et al. | 340/10.1 |

FOREIGN PATENT DOCUMENTS

| | | |
|---|---|---|
| CN | 101061492 | 10/2007 |
| CN | 101216875 | 7/2008 |
| TW | M315380 | 7/2007 |
| WO | 2006-080976 | 8/2006 |
| WO | 2007-005135 | 1/2007 |

OTHER PUBLICATIONS

"1st Office Action of China Counterpart Application", issued on Dec. 9, 2011, p. 1-p. 8, in which the listed references were cited.

* cited by examiner

*Primary Examiner* — Chi H. Pham
*Assistant Examiner* — Kevin Mew
(74) *Attorney, Agent, or Firm* — Jianq Chyun IP Office

(57) ABSTRACT

Exemplary embodiments of the present invention illustrate a probability time division multiplexing polling method and a wireless identifier reader controller thereof. The probability time division multiplexing polling method is used to control a plurality of wireless identifier readers to be turned on or off. First, one of the wireless identifier readers is randomly selected according to a probability model, wherein the probability model presents the probabilities for detecting an identifier tag of the wireless identifier readers. Then, the selected wireless identifier reader is turned on for a predetermined time period.

18 Claims, 9 Drawing Sheets

PROBABILITY TIME DIVISION MULTIPLEXING POLLING METHOD AND WIRELESS IDENTIFIER READER CONTROLLER THEREOF

CROSS-REFERENCE TO RELATED APPLICATION

This application claims the priority benefit of Taiwan application serial no. 98117447, filed on May 26, 2009. The entirety of the above-mentioned patent application is hereby incorporated by reference herein and made a part of specification.

BACKGROUND OF THE INVENTION

1. Field of Invention

The present invention generally relates to a wireless identifier reader system, and more particularly to a probability time division multiplexing polling method and a wireless identifier reader controller thereof, wherein the probability time division multiplexing polling method and the wireless identifier reader controller are used in the wireless identifier reader system.

2. Description of Prior Art

The wireless communication technology is becoming more and more mature, and is applied on the daily life, for example, the wireless identifier reader system is applied on the ticket system of mass rapid transit (MRT) system. When the passenger comes into or departs from the MRT station, he or she must put the ticket card in the sensing region of the wireless identifier reader, so as to come into or depart from the MRT station successfully. The wireless identifier reader adopted by the MRT system has a smaller sensing region, and therefore the wireless identifier readers could not interfere with each other.

Under some conditions, the larger sensing regions of the wireless identifier readers in the wireless identifier reader system are demanded. For example, each of visitors is assigned an identifier tag in the exhibitive place, and each of exhibitive regions has at least a wireless identifier reader having the larger sensing region. When the visitor walks to the exhibitive region, the wireless identifier reader directly detects the identifier tag carried by the visitor, so as to store the visit record of the visitor. The wireless identifier reader having the larger sensing region is not same as the wireless identifier reader adopted by the MRT system, and the visitor need not take out the identifier tag to put it in the sensing region of the wireless identifier reader. However the wireless identifier readers could interfere with each other potentially due to the larger sensing regions of the wireless identifier readers.

Referring to FIG. 1A and FIG. 1B, FIG. 1A is a plan view of the exhibitive place, and FIG. 1B is block diagram of a wireless identifier reader system. The exhibitive place of FIG. 1A is divided into several exhibitive regions $A_1$-$A_{10}$, and each exhibitive region $A_i$ (i is an integer from 1 to 10) has at least a wireless identifier reader $WR_i$, wherein the wireless identifier reader $WR_i$ may be a radio frequency identifier reader (RFID reader). The wireless identifier reader $WR_i$ is used to detect the identifier tag carried by the visitor, such as a RFID tag. In FIG. 1B, wireless identifier readers $WR_1$-$WR_5$ of the several neighboring exhibitive regions $A_1$-$A_5$ are connected to a hub $HUB_1$, and the hub $HUB_1$ is connected to a wireless identifier reader controller $CR_1$. The wireless identifier reader controller $CR_1$ is used to control the wireless identifier readers $WR_1$-$WR_5$ to be turned on or off. When one of the wireless identifier readers $WR_1$-$WR_5$ in the terminal end detects the identifier tag carried by the visitor, the wireless identifier reader controller $CR_1$ transmit the identifier information of the detection result to the message queue MQ via the Ethernet, and then the listener LN in the back end continuously writes the content in the message queue into the database DB.

In the similar manner, wireless identifier readers $WR_6$-$WR_{10}$ of the several neighboring exhibitive regions $A_6$-$A_{10}$ are connected to a hub $HUB_2$, and the hub $HUB_2$ is connected to a wireless identifier reader controller $CR_2$. The wireless identifier reader controller $CR_2$ is used to control the wireless identifier readers $WR_6$-$WR_{10}$ to be turned on or off. When one of the wireless identifier readers $WR_6$-$WR_{10}$ in the terminal end detects the identifier tag carried by the visitor, the wireless identifier reader controller $CR_2$ transmit the identifier information of the detection result to the message queue MQ via the Ethernet, and then the listener LN in the back end continuously writes the content in the message queue into the database DB. Besides, the database DB is connected to a client querying device CS, such as a personal computer or the computers of other kinds. The client querying device CS is used to query the database, so as to search the visit record of the visitor which is stored in the database DB, and the value of the products or the service exhibited in the exhibitive region can be analyzed according to the stored visit record.

To solve the problem of the potential interference between the wireless identifier readers, some documents and patents disclose some solutions for the problem of the potential interference. The ROC patent M315380 discloses a fixed time polling method to turn on or off the wireless identifier readers. The fixed time polling method only allows one of the wireless identifier readers being turned on at the same time. The WIPO publication WO/2006/080976 discloses a managing system solving the problem of the potential interference. When the wireless identifier readers detects an identifier tag, the managing system selects a appropriate one wireless identifier reader to transmit the identifier information of the identifier tag, and disables the neighboring wireless identifier readers of the appropriate one to transmit the identifier information of the identifier tag simultaneously. Besides, the WIPO publication WO/2007/005135 discloses a time-frequency division multiplexing polling method to turns on or off a plurality of wireless identifier readers. However, the WIPO publication WO/2007/005135 does not disclose and teach how to perform time division multiplexing.

SUMMARY OF THE INVENTION

The exemplary example of the present invention provides a probability time division multiplexing polling method and a wireless identifier reader controller thereof. The probability time division multiplexing polling method and the wireless identifier reader controller are used in the wireless identifier reader system and are different from those of the cited references.

The exemplary example of the present invention provides a probability time division multiplexing polling method and a wireless identifier reader controller thereof, and the probability time division multiplexing polling method and the wireless identifier reader controller are used in the wireless identifier reader system to control the wireless identifier readers to be turned on or off, so as to solve the problem of potential interference between the wireless identifier readers.

The exemplary example of the present invention provides a probability time division multiplexing polling method used to control a plurality of wireless identifier readers to be turned on or off. First, one of the wireless identifier readers is randomly selected according to a probability model, wherein the probability model presents the probabilities for detecting an identifier tag of the wireless identifier readers. Then, the selected wireless identifier reader is turned on for a predetermined time period.

The exemplary example of the present invention provides a wireless identifier reader controller used to control a plurality of wireless identifier readers to be turned on or off. The wireless identifier reader controller comprises a computation device and an enablement control circuit, wherein the enablement control circuit is coupled to the computation device. The computation device is used to select one of the wireless identifier readers according to a probability model, wherein the probability model presents the probabilities for detecting an identifier tag of the wireless identifier readers. The enablement control circuit is used to turn on the selected wireless identifier reader for a predetermined time period.

The exemplary example of the present invention provides a wireless identifier reader system. The wireless identifier reader system comprises a plurality of first wireless identifier readers and a wireless identifier reader controller. The first wireless identifier reader controller is used to control the first wireless identifier reader to be turned on or off. The wireless identifier reader controller comprises a computation device and an enablement control circuit, wherein the enablement control circuit is coupled to the computation device. The computation device is used to select one of the wireless identifier readers according to a probability model, wherein the probability model presents the probabilities for detecting an identifier tag of the wireless identifier readers. The enablement control circuit is used to turn on the selected wireless identifier reader for a predetermined time period.

Accordingly, the exemplary example provides a probability time division multiplexing polling method to solve the problem of potential interference between the wireless identifier readers, and to store the visitor's visit record accurately by detecting the identifier tag.

It is to be understood that both the foregoing general description and the following detailed description are exemplary, and are intended to provide further explanation of the present invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the present invention.

DESCRIPTION OF THE EMBODIMENTS

Figure 1A:
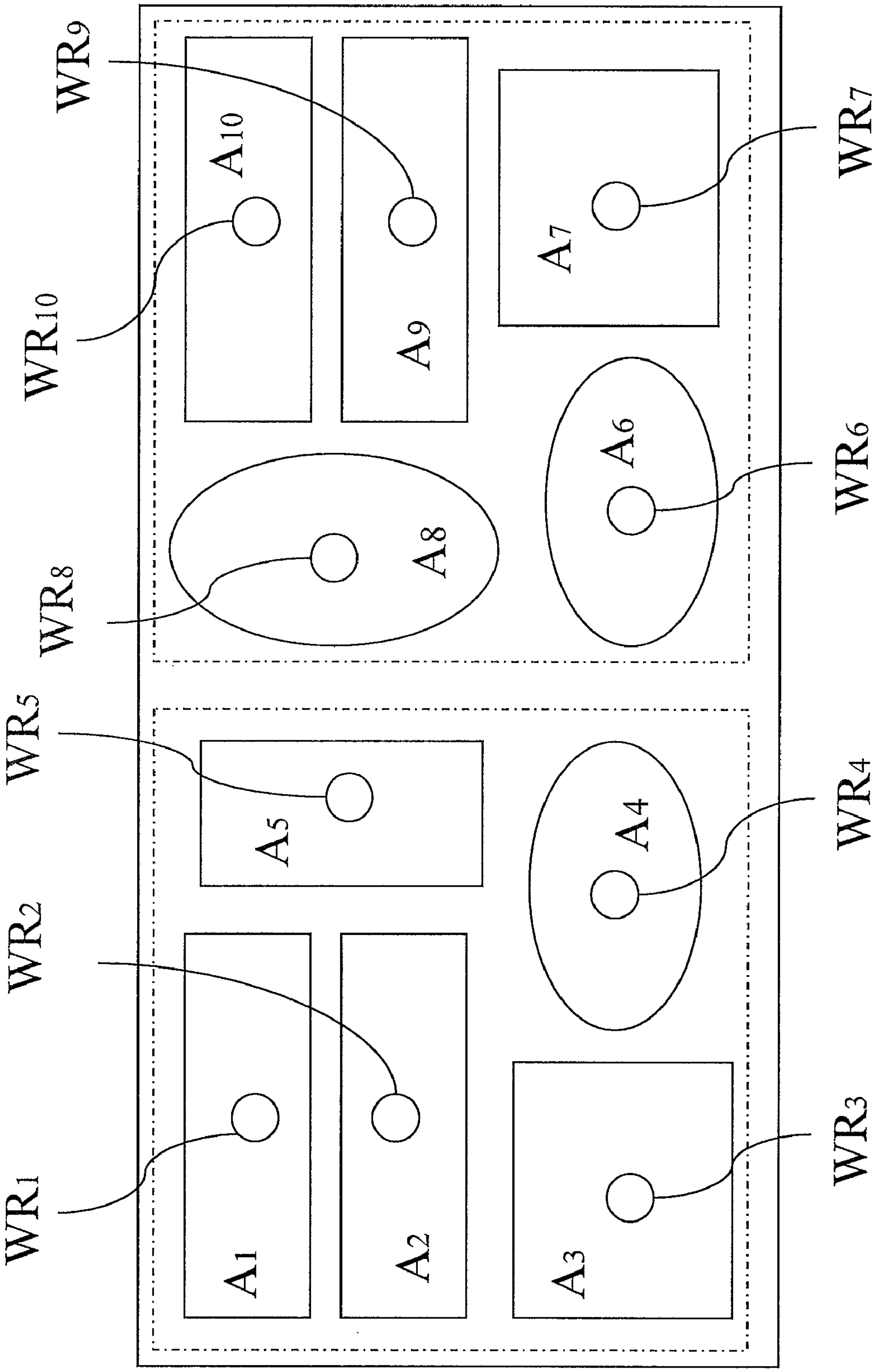
FIG. 1A(PRIOR ART)
FIG. 1A is a plan view of the exhibitive place.

Reference will now be made in detail to the present preferred embodiment of the invention, examples of which are illustrated in the accompanying drawings. Wherever possible, the same reference numbers are used in the drawings and the description to refer to the same or like parts.

The exemplary example of the present invention provides a probability time division multiplexing polling method and a wireless identifier reader controller thereof. The probability time division multiplexing polling method and the wireless identifier reader controller are used in the wireless identifier reader system and are different from those of the cited references. It is noted that the drawings of the following exemplary examples are just explanation examples, and not used to limit the scope of the present invention.

Figure 1B:
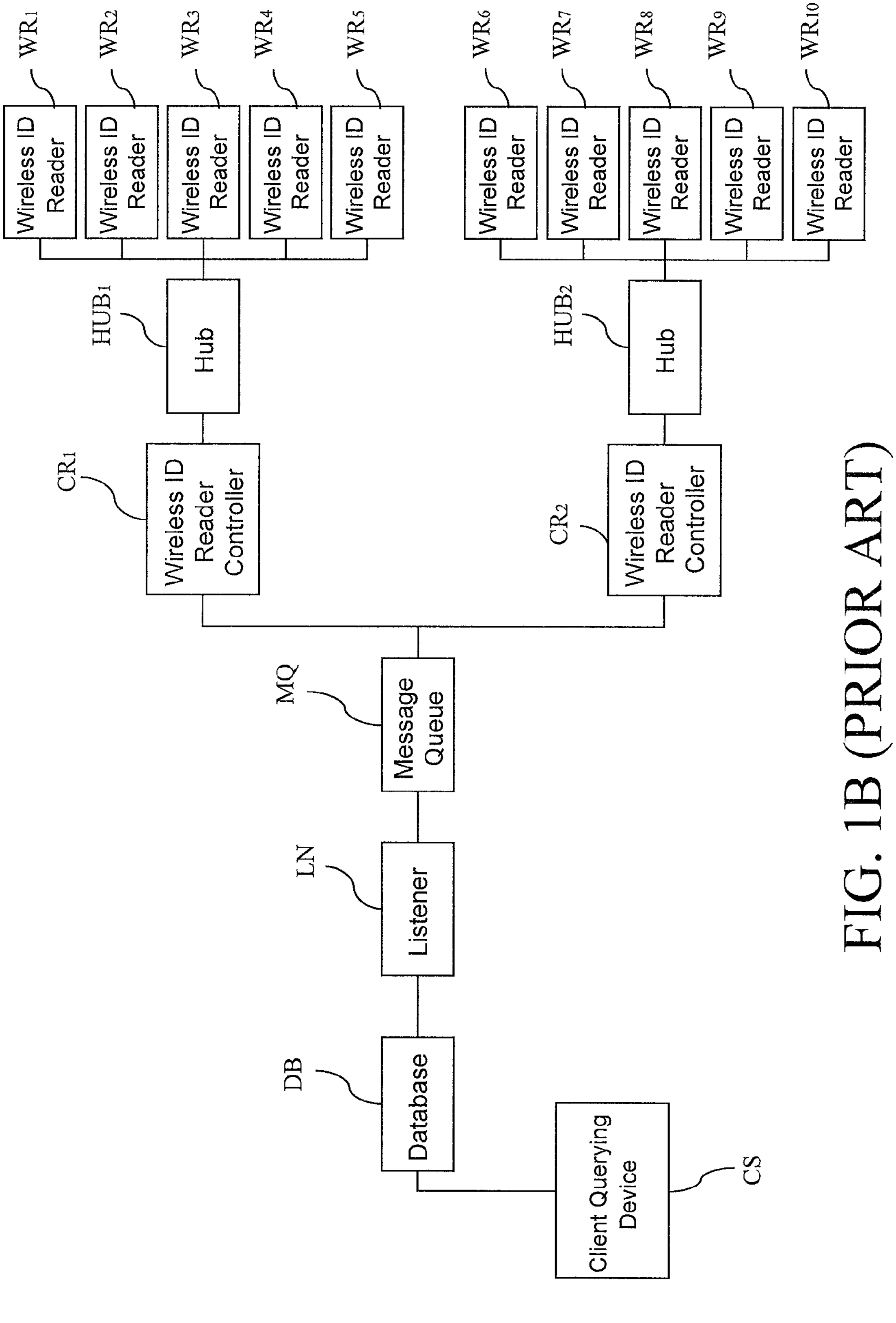
FIG. 1B (PRIOR ART)
FIG. 1B is block diagram of a wireless identifier reader system.

The exemplary example of the present invention provides a probability time division multiplexing polling method and a wireless identifier reader controller thereof. The probability time division multiplexing polling method and the wireless identifier reader controller are used in the wireless identifier reader system and are different from those of the cited references. The probability time division multiplexing polling method are executed in the wireless identifier reader controller, such as the e wireless identifier reader controller CR1 and CR2 in FIG. 1B. Next, the exhibitive place of FIG. 1A and the wireless identifier reader system of FIG. 1B are taken for example to describe the probability time division multiplexing polling method and the wireless identifier reader controller thereof provided by the exemplary example the present invention.

The wireless identifier reader controller $CR_1$ is connected to the hub $HUB_1$ and used to control the wireless identifier readers $WR_1$-$WR_5$ via the hub $HUB_1$, wherein the wireless identifier reader $WR_1$-$WR_5$ may be the RFID readers, and the operating frequency of wireless identifier reader $WR_1$-$WR_5$ is not limited thereto. The wireless identifier reader controller $CR_1$ and the hub $HUB_1$ may be integrated into a single one electronic apparatus or be the two independent electronic apparatuses. It is noted that, although the total number of wireless identifier reader $WR_1$-$WR_5$ in the exemplary example is 5, the total number of the wireless identifier reader is not limited thereto. After a plurality of comparison and experiments are completed and performed, the optimal total number of the wireless identifier readers controlled by the wireless identifier reader controller is six, and the optimal distance of two closest wireless identifier readers is 0.5 meter. However, the exemplary examples of FIG. 1A and FIG. 1B are used to describe the present invention, and do not adopt these above optimal value.

Figure 2A:
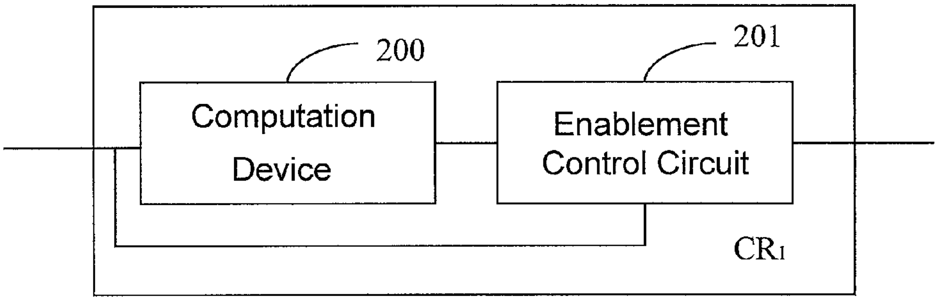
FIG. 2A is a block diagram of the wireless identifier reader controller $CR_1$ provided by one exemplary example of the present invention.

Next, referring to FIG. 2A, FIG. 2A is a block diagram of the wireless identifier reader controller $CR_1$ provided by one exemplary example of the present invention. It is noted that although FIG. 2A takes the wireless identifier reader controller $CR_1$ for example, the wireless identifier reader controller $CR_2$ may same as the wireless identifier reader controller $CR_1$ in the wireless identifier reader system. To sum up, the present invention is not limited thereto. The wireless identifier reader controller $CR_1$ comprises a computation device 200 and an enablement control circuit 201, wherein the computation device 200 is coupled to the enablement control circuit 201 and the message queue MQ, and the enablement control circuit 201 is coupled to the hub $HUB_1$ and the message queue MQ.

The computation device 200 randomly selects one of the wireless identifier reader $WR_1$-$WR_5$ controlled by itself according to a probability model, wherein the probability model presents the probability for detecting an identifier tag of each wireless identifier reader. For example, the probability model may be a probability density function p(i) for detecting an identifier tag of each wireless identifier reader, wherein p(i) presents the probability for detecting the identifier tag of the wireless identifier reader $WR_i$. The enablement control circuit 201 is used to turns on the wireless identifier reader selected by the computation device 200 for a predetermined time period, and turns off the non-selected wireless identifier readers. When the selected wireless identifier reader is turned in the predetermined time period, and detects the identifier tag, such as RFID tag, carried by the visitor, the detection result is transmitted to the enablement control circuit 201. Then the enablement control circuit 201 transmit the detection result to the message queue MQ. After the selected wireless identifier reader is turned for the predetermined time period, the enablement control circuit 201 turns off the selected wireless identifier reader. Next, the computation device 200 and the enablement control circuit 201 repeats the step mentioned above, so as to let all of the wireless identifier reader $WR_1$-$WR_5$ have the chance to be turned on. In other word, the computation device 200 and the enablement control circuit 201 in fact are used to execute the probability time division multiplexing polling method.

It is noted that the above probability model may be a steady probability model, such as a uniform distribution, or be a probability model which is often updated. The computation device 200 initializes the probability model, when the wireless identifier reader system is power on. Then the computation device 200 receives the statistic data from the database DB and updates the probability model according to the statistic data every time period. Furthermore, the computation device 200 may also receives the probability data from the client querying device CS and initializes the probability model according to the probability data when the wireless identifier reader system is power on. In addition, the client querying device CS may directly send the probability data to the computation device 200 to instruct the computation device 200 directly reset the probability model.

Figure 2B:
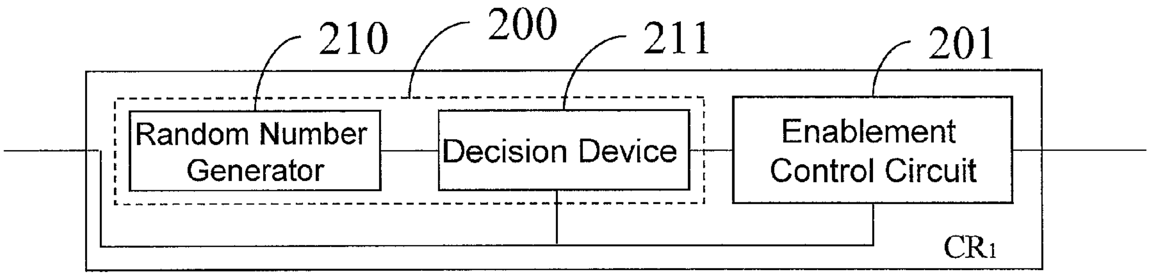
FIG. 2B is a block diagram of the wireless identifier reader controller $CR_1$ provided by another one exemplary example of the present invention.

Next, referring to FIG. 2, FIG. 2B is a block diagram of the wireless identifier reader controller $CR_1$ provided by another one exemplary example of the present invention. It is noted that FIG. 2 is one implementation manner of the computation device 200, and the present invention is not limited thereto. In the exemplary example of FIG. 2B, the computation device 200 comprises random number generator 210 and decision device 211, wherein the random number generator 210 is coupled to the decision device 211, the decision device 211 is coupled to the enablement control circuit 201 and the message queue M. The random number generator 210 is used to generate a random number. The decision device 211 selects one of the wireless identifier readers $WR_1$-$WR_5$ according to the generated random number, and transmits the information corresponding to the selected wireless identifier reader to the enablement control circuit 201. Therefore, the enablement control circuit 201 can turns on the selected wireless identifier reader for the predetermined time period. It is noted that the predetermined time period may be a fix time period or a dynamic time period varying with the different condition.

To put it concretely, the decision device 211 generates a plurality of numeric intervals according to the probability mode, and determines the numeric interval within which the random number generated by the random number generator 210 falls. Next, the decision device 211 selects the wireless identifier reader corresponding to the numeric interval within which the random number falls, and indicates the information of the selected wireless identifier reader to the enablement control circuit 201. Assuming several numeric internals $Interval_1$-$Interval_5$ is generated from a specific numeric range which is from 0 to 1, the random number generator 210 would randomly generate a random number within the a specific numeric range which is from 0 to 1, wherein the numeric interval $Interval_i$ corresponds to the wireless identifier reader $WR_i$, the range of the numeric interval $Interval_i$ is correlated to the probability for detecting the identifier tag of the wireless identifier reader $WR_i$, and i is an integer from 1 to 5. If the probabilities for detecting the identifier tag of the wireless identifier reader $WR_1$-$WR_5$ are equal, i.e. the probability model is a uniform distribution, the numeric interval $Interval_i$ will be an interval which is lager than and equal to $0.2\times(i-1)$ but less than $0.2\times i$. When the random number randomly generated by the random number generator 210 is 0.978, the wireless identifier reader $WR_5$ is turned on for the predetermined time period. In the similar manner, when the random number randomly generated by the random number generator 210 is 0.438, the wireless identifier reader $WR_3$ is turned on for the predetermined time period. It is noted that although the above exemplary example assumes that the numeric internals $Interval_1$-$Interval_5$ is generated from a specific numeric range which is from 0 to 1 and the probability model is the uniform distribution, the present invention is not limited thereto. Besides, when the probability model is the uniform distribution, the averaging time for being turned on of each wireless identifier reader is the half of predetermined time period times the total number of the wireless identifier readers.

Moreover, the probability model may a dynamic probability model varying with time. Hence, the decision device 211 initializes the probability model when the wireless identifier reader system is power on. Then the decision device 211 receives the statistic data from the database DB and updates the probability model according to the statistic data every time period. Furthermore, the decision device 211 may also receives the probability data from the client querying device CS and initializes the probability model according to the probability data when the wireless identifier reader system is power on. In addition, the client querying device CS may directly send the probability data to the decision device 211 to instruct the decision device 211 directly reset the probability model.

Figure 3A:
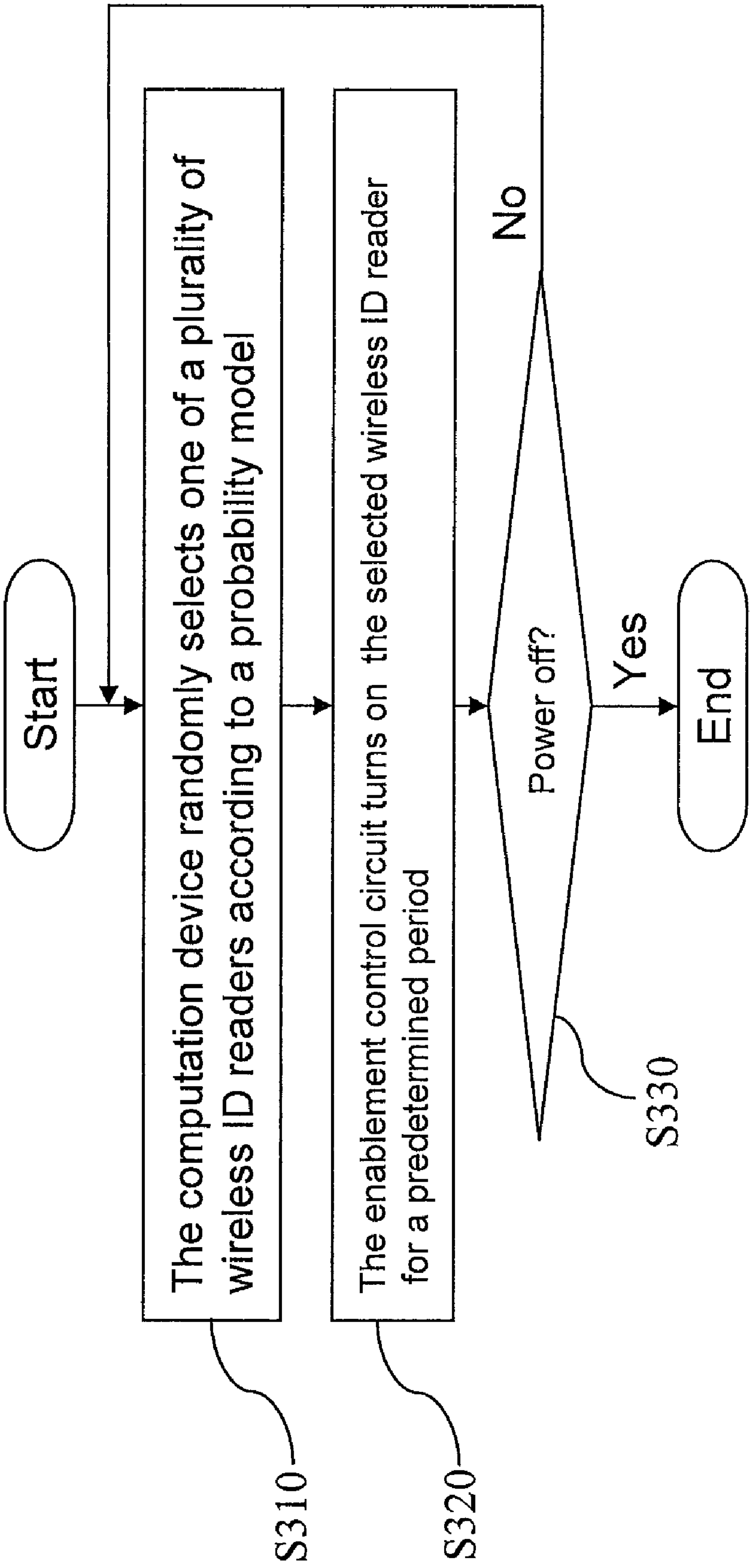
FIG. 3A is a flow chart of the probability time division multiplexing polling method provided by one exemplary example of the present invention.

Next, referring to FIG. 3A, FIG. 3A is a flow chart of the probability time division multiplexing polling method provided by one exemplary example of the present invention. The probability time division multiplexing polling method is executed in the wireless identifier reader controller, so as to poll the wireless identifier readers. Please see FIG. 2A and FIG. 3A, in step S310, the computation device 200 randomly selects one of a plurality of wireless identifier readers $WR_1$-$WR_5$ according to a probability model. In step S320, the enablement control circuit 201 enables the selected wireless identifier reader for a predetermined period. In step S330, whether the wireless identifier reader controller $CR_1$ is power off is determined. If the wireless identifier reader controller $CR_1$ is power off, the probability time division multiplexing polling method will be finished. If the wireless identifier reader controller $CR_1$ is not power off, the probability time division multiplexing polling method will go back to execute step S310.

Figure 3B:
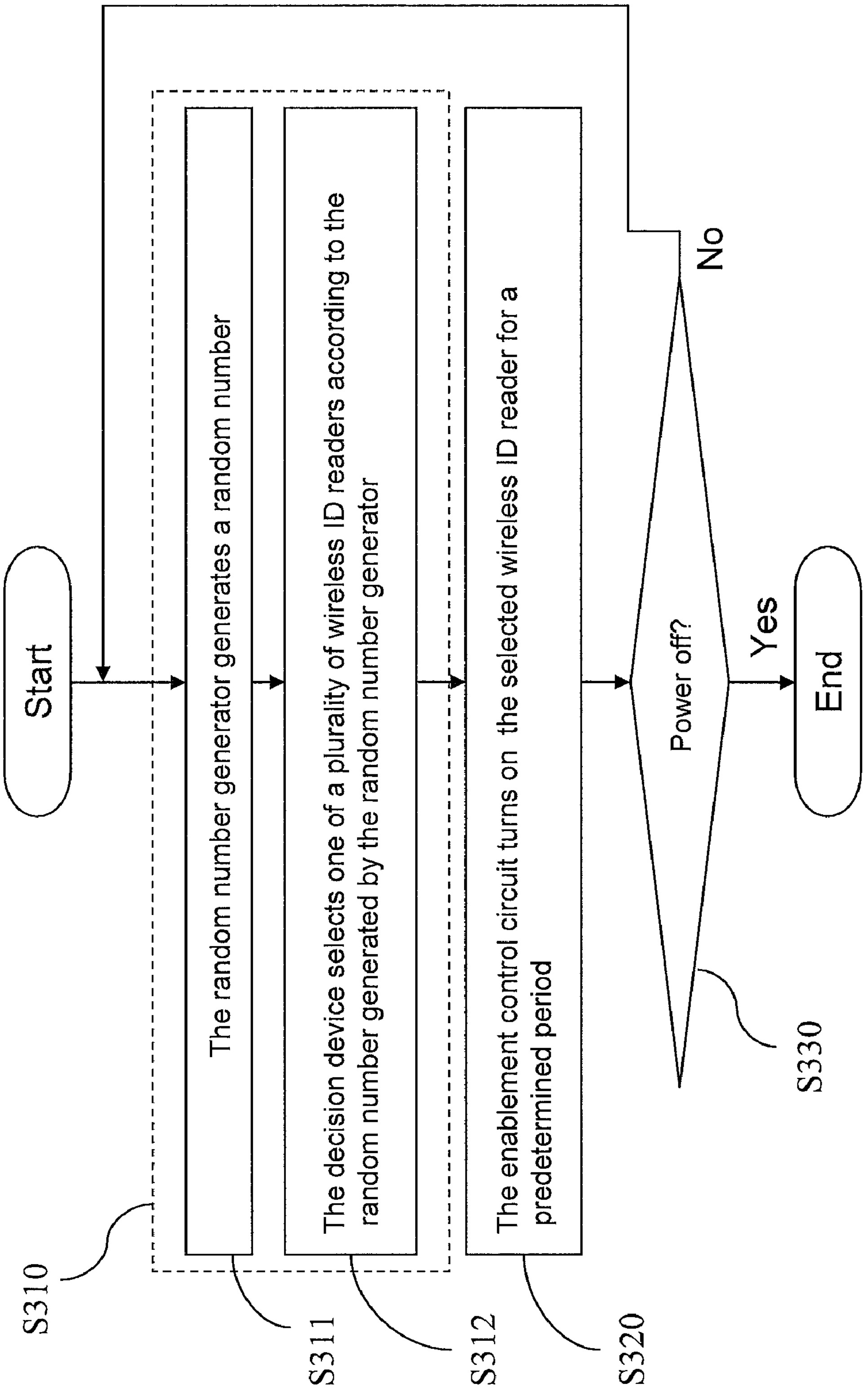
FIG. 3B is a flow chart of the probability time division multiplexing polling method provided by another one exemplary example of the present invention.

Next, referring to FIG. 3B, FIG. 3B is a flow chart of the probability time division multiplexing polling method provided by another one exemplary example of the present invention. FIG. 3B is a detailed flow chart and implementation manner of the probability time division multiplexing polling method of FIG. 3A, and the probability time division multiplexing polling method of FIG. 3B is executed in the wireless identifier reader controller $CR_1$ of FIG. 2B. In FIG. 3B, step S310 comprises steps S311 and S312. In step S311, the random number generator 210 generates a random number within in a specific numeric range, wherein the specific numeric range is predefined by the designer, and the specific numeric range is equal to the range of the combination of the numeric intervals. Next, in step S312, the decision device 211 selects one of a plurality of wireless identifier readers $WR_1$-$WR_5$ according to the random number generated by the random number generator 210, wherein the decision device 211 determines the numeric interval within which the random number falls, and selects the wireless identifier reader corresponding to the numeric interval within which the random number falls.

Herein, several examples are given as follows to demonstrate the probability time division multiplexing polling method of FIG. 3B. Assuming the probabilities for detecting the identifier tag of the wireless identifier reader $WR_1$-$WR_5$ are equal, i.e. the probability model is the uniform distribution, and the random number may be an integer from 1 to 5, if the random number generated by the random number generator 210 is i, the decision device 211 will selects the wireless identifier reader $WR_i$. Assuming the probability model is given as follows, the probabilities for detecting the identifier tag of the wireless identifier reader $WR_1$-$WR_5$ are respectively 0.3, 0.2, 0.1, 0.2 and 0.2, and assuming the specific numeric range is from 0 to 1, then the numeric intervals corresponding to the wireless identifier reader $WR_1$-$WR_5$ are respectively the numeric interval larger than or equal to 0 but less than 0.3, the numeric interval larger than or equal to 0.3 but less than 0.5, the numeric interval larger than or equal to 0.5 but less than 0.6, the numeric interval larger than or equal to 0.6 but less than 0.8, and the numeric interval larger than or equal to 0.8 but less than 1. When the random number generated by the random number generator 210 is 0.978, the wireless identifier reader $WR_5$ is turned on for a predetermined time period. In the similar manner, when the random number generated by the random number generator 210 is 0.438, the wireless identifier reader $WR_2$ is turned on for a predetermined time period.

Regarding the probability time division multiplexing polling method of FIGS. 3A and 3B, the probability model is assumed to be a steady probability model. However, in the real application, in order to reduce the potential interference more, the probability model is considered as a dynamic probability model. Herein, FIGS. 3C-3E describes the dynamic probability time division multiplexing polling methods.

Figure 3C:
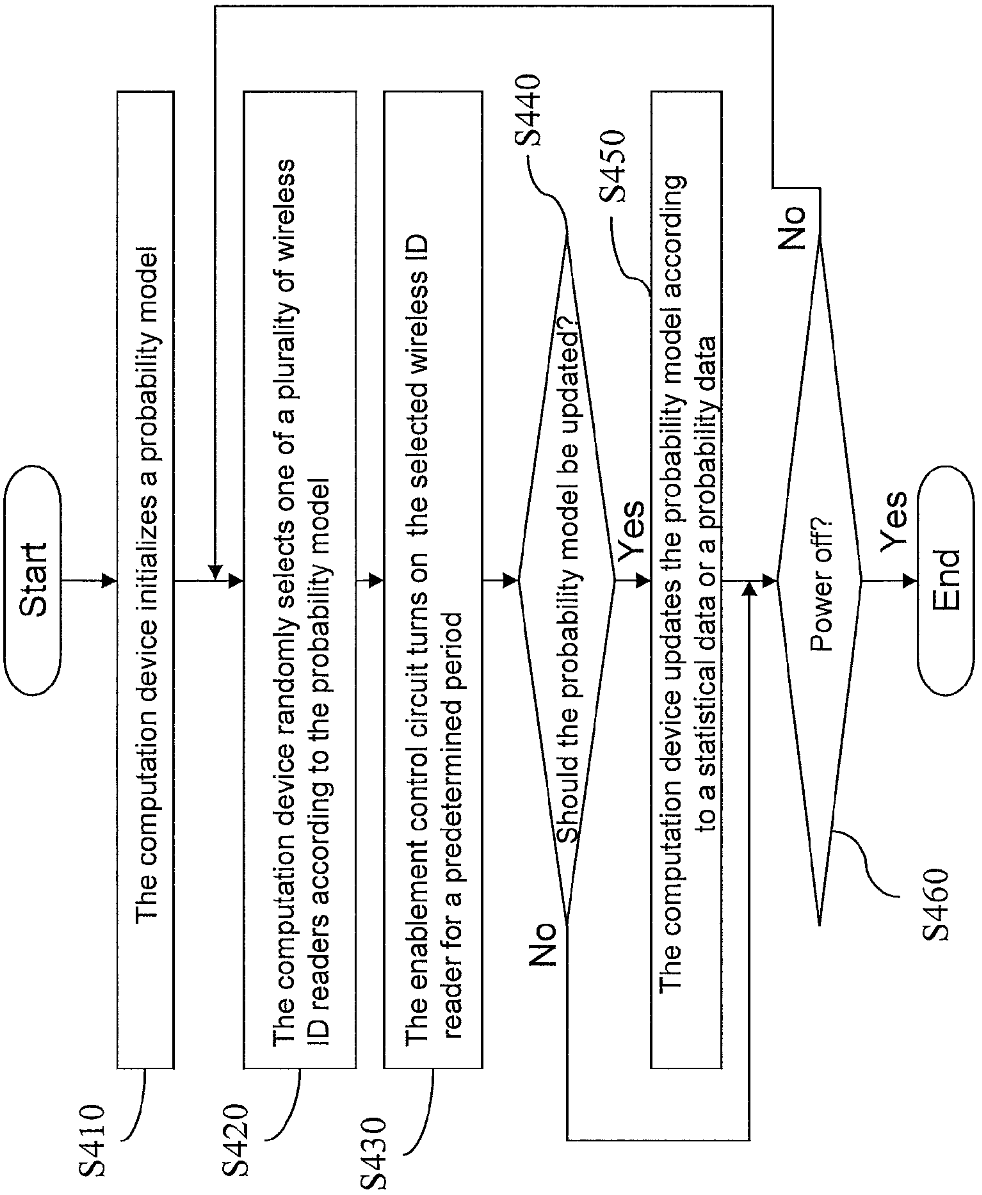
FIG. 3C is a flow chart of the probability time division multiplexing polling method provided by another one exemplary example of the present invention.

Referring to FIG. 2A and FIG. 3C, FIG. 3C is a flow chart of the probability time division multiplexing polling method provided by another one exemplary example of the present invention. The probability time division multiplexing polling method of FIG. 3C is a dynamic probability time division multiplexing polling method. The dynamic probability time division multiplexing polling method performs under the case that the probability model is a dynamic probability model. The a dynamic probability model is updated dynamically according to the statistic data which the wireless identifier readers write into the database DB previously, or according to the probability data input by the designer. Therefore, the probability model in FIG. 3C is more approximate to the probability model for detecting the identifier tag in the real world than those of FIG. 3A and FIG. 3B, and that is, the probabilities for detecting the identifier tag of the wireless identifier readers defined in probability model of FIG. 3C will be more approximate to the probabilities for detecting the identifier tag of the wireless identifier readers in the real world.

In step S410, the computation device initializes a probability model. When the wireless identifier reader system is power on, the computation device 200 can initialize the probability model according the statistic data stored in the database DB, or initialize the probability model to a predefined probability model. Generally speaking, the computation device 200 can initialize the probability model to a probability model of the uniform distribution. Next, in step 420, the computation device 200 randomly selects one of a plurality of wireless ID readers $WR_1$-$WR_5$ according to the probability model. Then, in step S430, the enablement control circuit 201 turns on the selected wireless ID reader for a predetermined period.

In step S440, the computation device 200 determines whether the probability model should be updated. If the probability model need not be updated, step S460 will be next executed; otherwise, step S440 will be next executed. The manner which the computation device 200 determines whether the probability model should be updated can be designed for the different conditions. For example, the computation device 200 calculates the time deviation between the previous updated time and current time. If the time deviation is lager than a specific value, the probability model shall be updated. This manner for updating the probability model is so-called definite time update. For another example, the computation device 200 can determines whether the probability data from the client querying device is received to update the probability model.

In step 450, the computation device 200 updates the probability model according to a statistical data or a probability data. When the definite time update is adopted, the computation device 200 queries the statistic data stored in the database DB. Then the computation device 200 updates the probability model according to a statistical data. When the computation device 200 receives the probability data from the client querying device CS (i.e. the client end wants to reset the probability model), the computation device 200 could update the probability model according the probability data predefined by the client end. Though only two manners for updating probability model are illustrated above, the present invention is not limited thereto. Next, in step S460, whether the wireless identifier reader controller $CR_1$ is power off is determined. If the wireless identifier reader controller $CR_1$ is power off, probability time division multiplexing polling method will be finished; otherwise, the probability time division multiplexing polling method will go back to execute step S410.

Figure 3D:
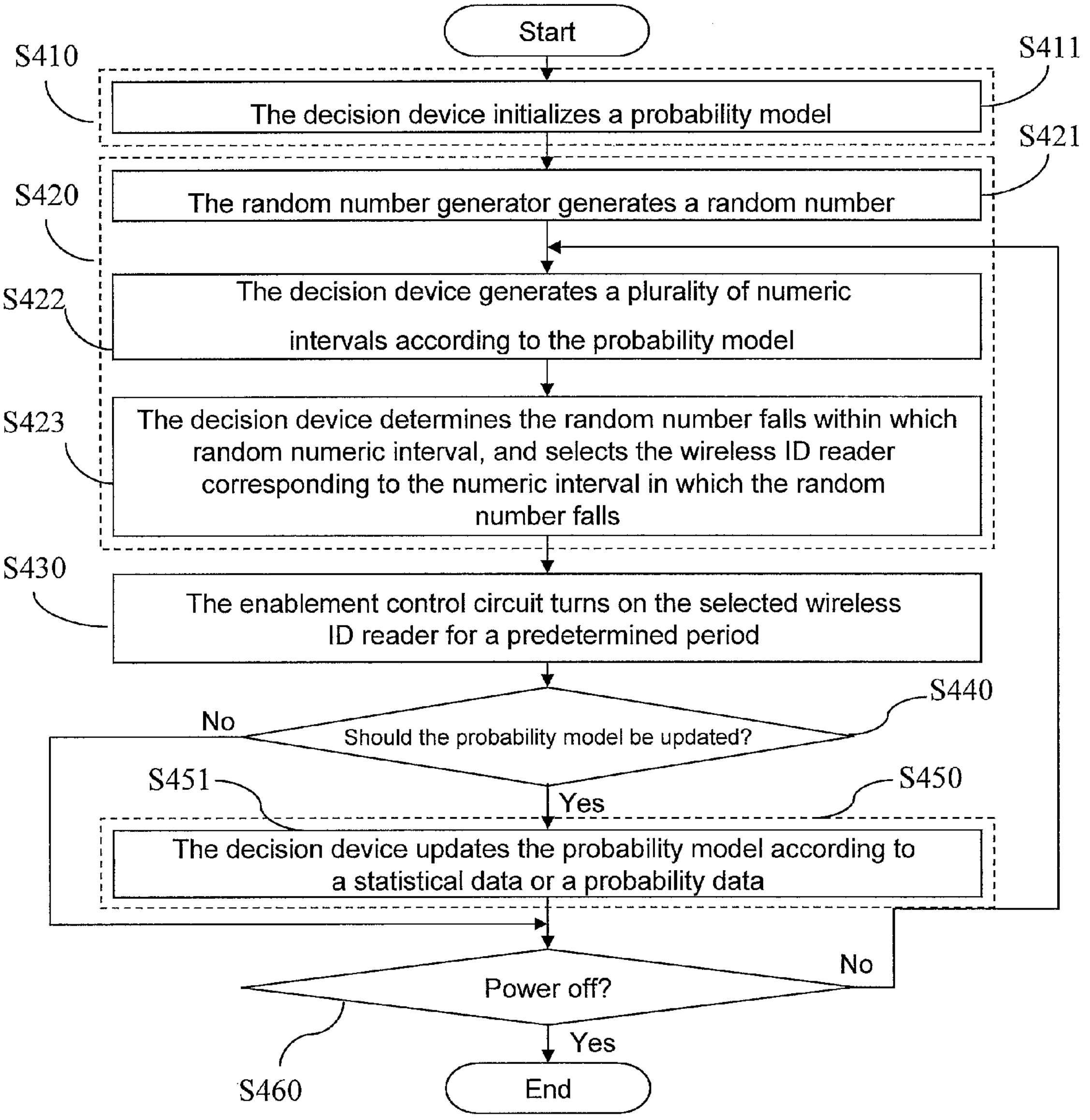
FIG. 3D is a flow chart of the probability time division multiplexing polling method provided by another one exemplary example of the present invention.

Next, please refer to FIG. 2B and FIG. 3D, FIG. 3D is a flow chart of the probability time division multiplexing polling method provided by another one exemplary example of the present invention. The probability time division multiplexing polling method of FIG. 3D is a detailed implementation of that of FIG. 3C, and the probability time division multiplexing polling method of FIG. 3D is executed in the wireless identifier reader controller $CR_1$ of FIG. 2B. In FIG. 3D, step S410 is achieved by step S411, step S420 is achieved by steps S411-S423, and step S450 is achieved by step S451.

In step S411 the decision device 211 initializes the probability model. The decision device 211 may initialized the probability model according to the statistic data stored in the database DB, or initialized the probability model to a predefined probability model.

In step S421, the random number generator 210 generates a random number within a specific numeric range defined by the designer, wherein the specific numeric range is equal to the combination of the numeric intervals. Next, in step S422, the decision device 211 generates a plurality of numeric intervals according to the probability model. To put it concretely, the decision device 211 divides the specific numeric range into numeric intervals according to the probability model, wherein each of the numeric intervals corresponds to one of the wireless identifier readers $WR_1$-$WR_5$. In step S423, the decision device 211 determines the random number falls in which random numeric interval, and selects the wireless ID reader corresponding to the random numeric interval within which the random number falls. In the other word, the decision device 211 selects one of the wireless ID reader $WR_1$-$WR_5$ according to the random numeric interval within which the random number falls.

In step S451, the decision device 211 updates the probability model according to a statistical data or a probability data. When the definite time update is adopted, the decision device 211 queries the statistic data stored in the database DB. Then the decision device 2110 updates the probability model according to a statistical data. When the computation device 200 receives the probability data from the client querying device CS (i.e. the client end wants to reset the probability model), the decision device 211 could update the probability model according the probability data predefined by the client end. Though only two manners for updating probability model are illustrated above, the present invention is not limited thereto.

Herein, several following examples are used to demonstrate the probability time division multiplexing polling method of FIG. 3D. Assuming the probability model is initialized to an uniform distribution (i.e. the probabilities for detecting the identifier tag of the wireless identifier reader $WR_1$-$WR_5$ are the same) in step S411, and the specific numeric range is from 0 to 1, thus the numeric intervals corresponding to wireless identifier reader $WR_1$-$WR_5$ are respectively the numeric interval larger than or equal to 0 but less than 0.2, the numeric interval larger than or equal to 0.2 but less than 0.4, the numeric interval larger than or equal to 0.4 but less than 0.6, the numeric interval larger than or equal to 0.6 but less than 0.8, and the numeric interval larger than or equal to 0.8 but less than 1. When the random number generated by the random number generator 210 is 0.978, the wireless identifier reader $WR_5$ is turned on for a predetermined time period. In the similar manner, when the random number generated by the random number generator 210 is 0.438, the wireless identifier reader $WR_2$ is turned on for a predetermined time period.

After time elapses, when the probability model should be updated, the decision device 211 updates the probability model according to the statistic data stored in the database DB. Assuming the statistic data stored in the database DB presents the times for detecting the identifier tag of wireless identifier reader $WR_1$-$WR_5$ are respectively 250, 250, 200, 150, and 150, thus the decision device 211 updates the probability model according to the statistic data, and the updated probability model presents the probabilities for detecting the identifier tag of wireless identifier reader $WR_1$-$WR_5$ are respectively 0.25, 0.25, 0.2, 0.15, and 0.15. The decision device 211 sets the numeric intervals corresponding to the wireless identifier reader $WR_1$-$WR_5$ according to the updated probability model, and the numeric intervals corresponding to the wireless identifier reader $WR_1$-$WR_5$ are respectively the numeric interval larger than or equal to 0 but less than 0.25, the numeric interval larger than or equal to 0.25 but less than 0.5, the numeric interval larger than or equal to 0.5 but less than 0.7, the numeric interval larger than or equal to 0.7 but less than 0.85, and the numeric interval larger than or equal to 0.85 but less than 1. When the random number generated by the random number generator 210 is 0.978, the wireless identifier reader $WR_5$ is turned on for a predetermined time period. In the similar manner, when the random number generated by the random number generator 210 is 0.438, the wireless identifier reader $WR_2$ is turned on for a predetermined time period.

Figure 3E:
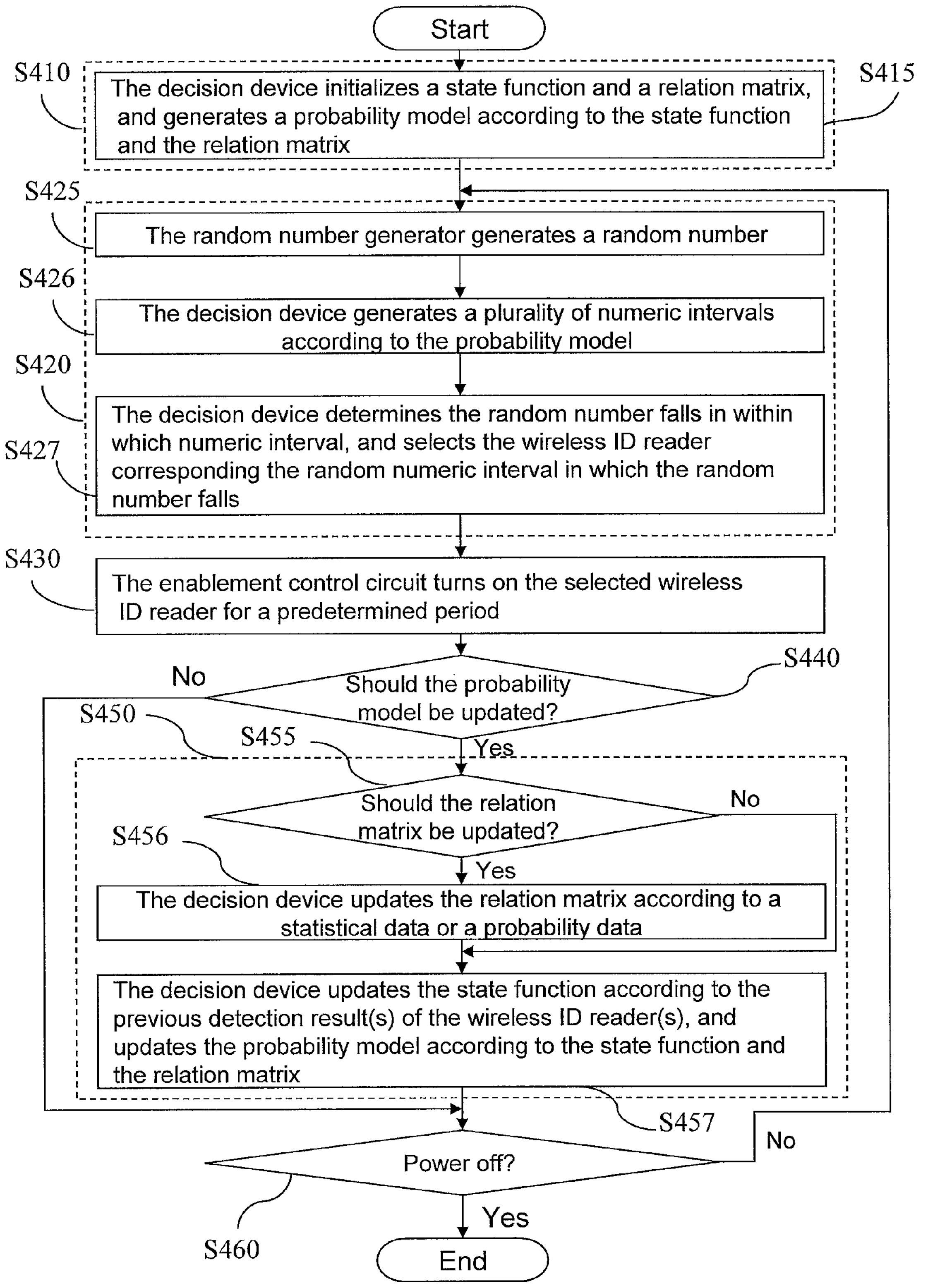
FIG. 3E is a flow chart of the probability time division multiplexing polling method provided by another one exemplary example of the present invention.

Next, referring to FIG. 2B and FIG. 3E, FIG. 3E is a flow chart of the probability time division multiplexing polling method provided by another one exemplary example of the present invention. The probability time division multiplexing polling method of FIG. 3E is another one detailed implementation of FIG. 3C, which is executed in the wireless identifier reader controller $CR_1$ of FIG. 2B. In FIG. 3E, step S410 is achieved by step S415, step S420 is achieved by steps S425-S427, and step S450 is achieved by steps S455-S457. Steps S425-S427 are the same as steps S421-S423 of FIG. 3D, and therefore steps S425-S427 are not described again.

The probability model described in FIG. 3E is obtained from a state function and a relation matrix. Herein the state function, the relation matrix, and how to obtain the probability model are illustrated. The state function in fact is vector used to present whether the wireless identifier readers detect the identifier tag, and is denoted S. The mathematic expression of the state function S is presented as follows, $$S = \begin{bmatrix} S_1 \\ S_2 \\ S_3 \\ \vdots \\ S_n \end{bmatrix},$$

wherein n is the total number of the wireless identifier readers, for any integer x from 1 to n, $S_x$ is 0 or 1, and $S_x$ is used to present the visit state of the wireless identifier reader $WR_x$. When $S_x$ is 1, it presents the wireless identifier reader $WR_x$ detects the identifier tag; when $S_x$ is 0, it presents the wireless identifier reader $WR_x$ does not detects the identifier tag. The state function S can be updated according to the previous detection results detected by wireless identifier readers at the previous time, or according to the previous detection detected by wireless identifier reader at the previous time. The previous detection result(s) detected by wireless identifier reader (s) at the previous time can be obtained by the database DB.

The relation matrix is used to present the relation between the wireless identifier readers, and the relation matrix is updated dynamically, for example, the relation matrix is updated according to the statistic data or the probability data. The relation matrix is denoted R, and the mathematic expression of the relation matrix R is presented as follows, $$R=\begin{bmatrix} x_{11} & x_{12} & \dots & x_{1n} \\ x_{21} & \ddots & \dots & x_{2n} \\ \vdots & \dots & \ddots & \vdots \\ x_{n1} & x_{n2} & \dots & x_{nn} \end{bmatrix},$$

wherein $x_{pq}$ presents the visit relation from the wireless identifier reader $WR_p$ to the wireless identifier reader $WR_q$, $x_{pp}$ is defined to 0, and p and q are integers from 1 to n. In the exemplary example of the present invention, the visit relation $x_{pq}$ may be the reciprocal of the distance from the wireless identifier reader $WR_p$ to the wireless identifier reader $WR_q$, the conditional visit probability from the wireless identifier reader $WR_p$ to the wireless identifier reader $WR_q$, or the visit ratio from the wireless identifier reader $WR_p$ to the wireless identifier reader $WR_q$, which is calculated from the statistic data. In short, the definition of the visit relation $x_{pq}$ is not used to limit the present invention.

For example, that the visit relation $x_{pq}$ is the visit ratio from the wireless identifier reader $WR_p$ to the wireless identifier reader $WR_q$ calculated from the statistic data is assumed. If the total number of the ireless identifier reader is four, and the statistic data records the visit record detect by the wireless identifier readers are respectively $\{1\rightarrow 3\rightarrow 4\rightarrow 1\rightarrow 2\}$, $\{2\rightarrow 3\rightarrow 1\}$, and $\{4\rightarrow 1\}$, the relation matrix R can be expressed as follows, $$R=\begin{bmatrix} 0 & 1/7 & 1/7 & 0 \\ 0 & 0 & 1/7 & 0 \\ 1/7 & 0 & 0 & 1/7 \\ 2/7 & 0 & 0 & 0 \end{bmatrix},$$

, wherein the visit record $\{2\rightarrow 3\rightarrow 1\}$ means that visitor first visits the wireless identifier reader $WR_2$, then visits the wireless identifier reader $WR_3$, and next visits the wireless identifier reader $WR_1$, and the other visit records $\{1\rightarrow 3\rightarrow 4\rightarrow 1\rightarrow 2\}$ and $\{4\rightarrow 1\}$ can be known and deduced by the similar manner.

After describing the definitions of the state function S and the relation matrix, herein the relation of probability model, the state function S, and the relation matrix R is described. The probability for detecting the identifier tag of the wireless identifier reader $WR_x$ is denoted $P_x$, and relation of the probability $P_x$, the state function S, and the relation matrix R is expressed as follows, $$([1\ \ 1\ \ \dots\ \ 1]\cdot(R\cdot S))^{-1}\cdot(R\cdot S)=\begin{bmatrix} P_1 \\ P_2 \\ P_3 \\ \vdots \\ P_n \end{bmatrix},$$

, wherein $\Sigma_{i=1}^{n}P_i=1$. The elements of the state function S is assumed as follows, $$S=\begin{bmatrix} 1 \\ 1 \\ 0 \\ \vdots \\ 0 \end{bmatrix},$$

, and thus the probability $P_q$ for detecting the identifier tag of the wireless identifier reader $WR_q$ in the probability model is expressed as follows, $$P_q=\frac{x_{q1}+x_{q2}}{\sum_{i=1}^{n} x_{i1}+x_{iq}}$$

The probability model can be calculated from the relation matrix R and the state function S, and the wireless identifier readers can be polled based upon the probability model.

Referring to FIG. 2B and FIG. 3E, in step S410, the decision device 211 initializes a state function S and a relation matrix R, and generates a probability model according to the state function S and the relation matrix R. It is noted that the state function S is not a zero vector. In step S440, the manner how the decision device 211 determines the probability model should be updated is to determine whether the relation matrix R should be updated, or to determine whether at least one of the wireless identifier readers detects the identifier tag at the previous time. If relation matrix R should be updated or at least one of the wireless identifier readers detects the identifier tag at the previous time, the probability model will be updated; otherwise, the probability model need not be updated. In other word, when the state function S is updated to be a non-zero vector according to the statistic data, or the relation matrix R is updated, the probability model could be updated.

Next, in step S455, the decision device 211 determines whether the probability model should be updated. If the probability model should be updated, step S456 will be executed next; otherwise, step S457 will be executed next. In step S456, the decision device 211 updates the relation matrix R according to a statistical data or a probability data. For example, the decision device 211 updates the relation matrix according to the visit record stored in the database, or updates the relation matrix according to the probability data defined by the designer or the client. Next, in step S457, the decision device 211 updates the state function S according to the detection result(s) detected by the wireless ID reader(s) at previous time, and updates the probability model according to the state function S and the relation matrix R, wherein the detection result(s) detected by the wireless ID reader(s) at previous time can be obtained from the statistic data stored in the database DB. By updating the state function S and relation matrix R dynamically, the probabilities for detecting the identifier tag of the wireless identifier readers in the probability model can be more approximate to the real probabilities for detecting the identifier tag of the wireless identifier readers.

Figure 4:
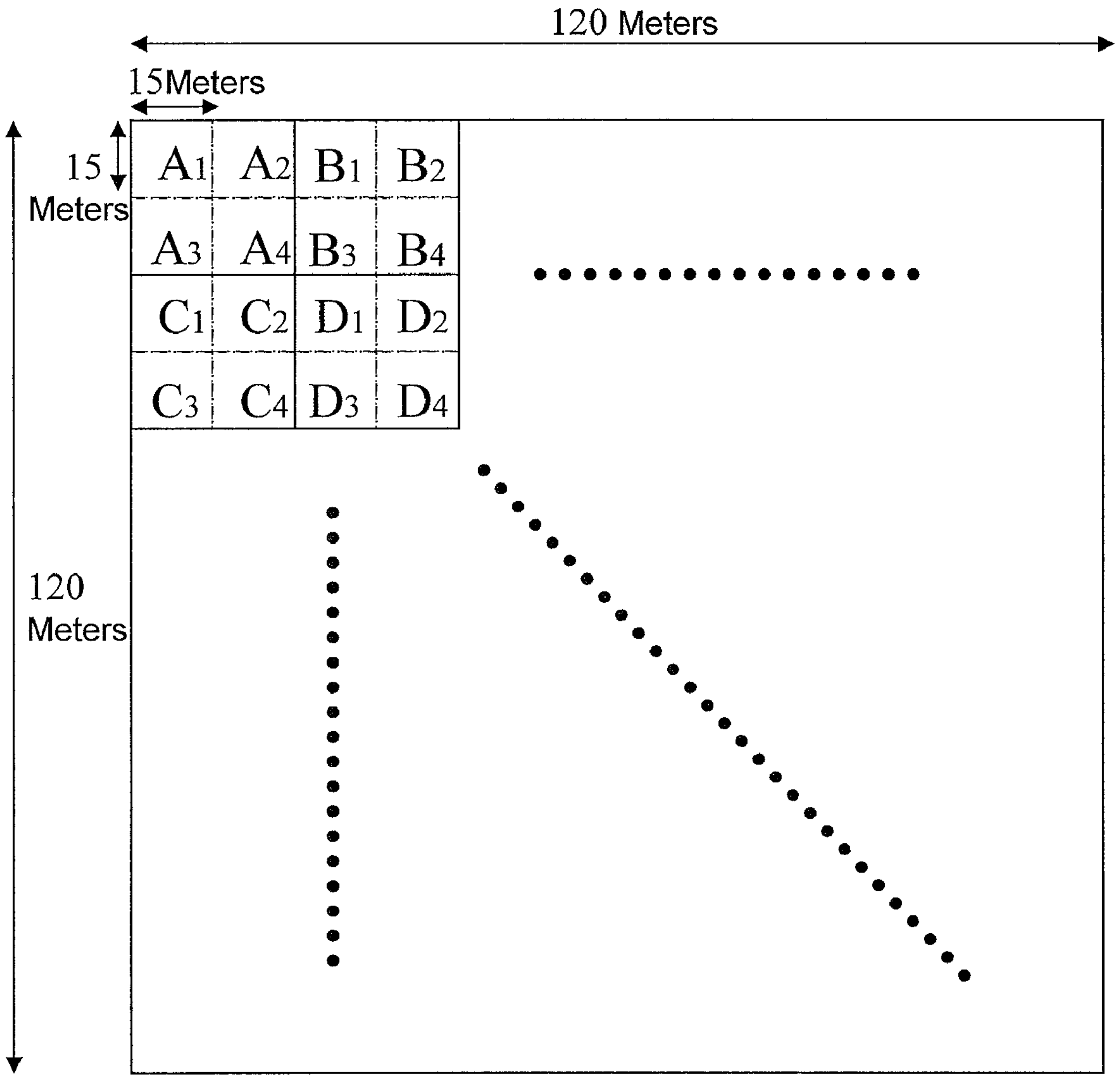
FIG. 4 is a plan view of the exhibitive place.

Finally, referring to FIG. 4, FIG. 4 is a plan view of the exhibitive place. In FIG. 4, the probability time division multiplexing polling methods above can be applied in the wireless identifier reader controllers in the exhibitive regions $A_1$-$A_4$, $B_1$-$B_4$, $C_1$-$C_4$, and $D_1$-$D_4$. An exhibitive place of a square with 120 meters edge is proposed, and each region of a square with 15 meters edge is also proposed. The frequency division multiplexing concept may be introduced into the probability time division multiplexing polling methods above, so as to propose the probability time-frequency division multiplexing polling methods. The wireless identifier readers of the exhibitive regions $A_1$-$A_4$ in FIG. 4 can adopt different operating frequencies, and the wireless identifier readers of the exhibitive regions $A_y$, $B_y$, $C_y$, and $D_y$ can use the same operating frequency, wherein y is integer from 1 to 4.

Accordingly, the exemplary example of the present invention provides a probability time division multiplexing polling method to control the wireless identifier readers to be turned on or off, so as to avoid the problem of the potential interference between the wireless identifier readers. Furthermore, the probability model in the probability time division multiplexing polling method can be a dynamic probability model, which can be automatically updated every definite time or be updated manually. Therefore the probabilities for detecting the identifier tag of the wireless identifier readers in the probability model are more approximate to the real probabilities for detecting the identifier tag of the wireless identifier readers.

It will be apparent to those skilled in the art that various modifications and variations can be made to the structure of the present invention without departing from the scope or spirit of the present invention. In view of the foregoing descriptions, it is intended that the present invention covers modifications and variations of this invention if they fall within the scope of the following claims and their equivalents.

What is claimed is:

1. A probability time division multiplexing polling method, executed in a wireless identifier reader controller and used to control a plurality of wireless identifier readers to be turned on or off, comprising steps of:

selecting one of the wireless identifier readers by the wireless identifier reader controller according to a probability model, wherein the probability model presents the probabilities for detecting an identifier tag of the wireless identifier readers, wherein the step of selecting one of the wireless identifier readers comprises steps of:

generating a random number within a specific numeric range randomly;

dividing the specific numeric range into a plurality of numeric intervals, wherein each of the numeric intervals corresponds to one of the wireless identifier readers; and selecting one of the wireless identifier readers according to the numeric interval within which the random number falls; and turning on the selected wireless identifier reader for a predetermined time period.

2. The probability time division multiplexing polling method according to claim 1, further comprising:

initializing the probability model; and updating the probability model according to a statistical data or a probability data, wherein the statistical data records detection results of the wireless identifier readers, and the probability data is pre-defined by a user.

3. The probability time division multiplexing polling method according to claim 2, wherein the probability model is initialized as a uniform distribution.

4. The probability time division multiplexing polling method according to claim 2, wherein the step of initializing the probability model comprises steps of:

initializing a state function and a relation matrix, wherein the state function presents whether the wireless identifier readers detects the identifier tag, and the relation matrix is used to present the relationship of the wireless identifier readers; and initializing the probability model according to the state function and the relation matrix.

5. The probability time division multiplexing polling method according to claim 2, wherein the step of updating the probability model comprises steps of:

updating a relation matrix according to the statistical data or the probability data, wherein the relation matrix is used to present the relationship of the wireless identifier readers;

updating a state function according to the statistical data, wherein the state function presents whether the wireless identifier readers detects the identifier tag; and updating the probability model according to the state function and the relation matrix.

6. The probability time division multiplexing polling method according to claim 1, further comprising:

turning off the selected wireless identifier reader after being turned on for the predetermined period; and repeating the step of selecting one of the wireless identifier readers, the step of turning on the selected wireless identifier reader, and the step of turning off the selected wireless identifier reader.

7. The probability time division multiplexing polling method according to claim 2, wherein the probability model is updated every time period.

8. The probability time division multiplexing polling method according to claim 1, wherein the wireless identifier reader is a radio frequency identifier reader.

9. The probability time division multiplexing polling method according to claim 1, wherein a total number of the wireless identifier reader is six.

10. The probability time division multiplexing polling method according to claim 1, wherein a distance of the two closest wireless identifier readers 0.5 meter.

11. A wireless identifier reader controller used to control a plurality of wireless identifier readers to be turned on or off, comprising:

a computation device, for selecting one of the wireless identifier readers according to a probability model, wherein the probability model presents the probabilities for detecting an identifier tag of the wireless identifier readers, wherein the computation device comprising:

a random number generator, generating a random number within a specific numeric range randomly; and a decision device, coupled to the random number generator, for dividing the specific numeric range into a plurality of numeric intervals, and selecting one of the wireless identifier readers according to the numeric interval within which the random number falls, wherein each of the numeric intervals corresponds to one of the wireless identifier readers; and an enablement control circuit, coupled to the computation device, for turning on the selected wireless identifier reader for a predetermined time period.

12. The wireless identifier reader controller according to claim 11, wherein the computation device further initializes the probability model, and updates the probability model according to a statistical data or a probability data, wherein the statistical data records detection results of the wireless identifier readers, and the probability data is pre-defined by a user.

13. The wireless identifier reader controller according to claim 12, wherein the probability model is initialized as a uniform distribution.

14. The wireless identifier reader controller according to claim 12, wherein the computation device initializes a state function and a relation matrix, and initializes the probability model according to the state function and the relation matrix, wherein the state function presents whether the wireless identifier readers detects the identifier tag, and the relation matrix is used to present the relationship of the wireless identifier readers.

15. The wireless identifier reader controller according to claim 12, wherein the computation device updates a relation matrix according to the statistical data or the probability data, updates a state function according to the statistical data, and updates the probability model according to the state function and the relation matrix, wherein the relation matrix is used to present the relationship of the wireless identifier readers, and the state function presents whether the wireless identifier readers detects the identifier tag.

16. The wireless identifier reader controller according to claim 11, wherein the enablement control circuit turns off the selected wireless identifier reader after being turned on for the predetermined period.

17. A wireless identifier reader system, comprising:

a plurality of first wireless identifier readers; and a first wireless identifier reader controller, for controlling the first wireless identifier reader to be turned on or off, comprising:

a computation device, for selecting one of the wireless first identifier readers according to a probability model, wherein the probability model presents the probabilities for detecting an identifier tag of the first wireless identifier readers, wherein the computation device comprising:

a random number generator, generating a random number within a specific numeric range randomly; and a decision device, coupled to the random number generator, for dividing the specific numeric range into a plurality of numeric intervals, and selecting one of the wireless identifier readers according to the numeric interval within which the random number falls, wherein each of the numeric intervals corresponds to one of the wireless identifier readers; and an enablement control circuit, coupled to the computation device, for turning on the selected first wireless identifier reader for a predetermined time period.

18. The wireless identifier reader system according to claim 17, further comprising:

a plurality of second wireless identifier readers; and a second wireless identifier reader controller, for controlling the second wireless identifier reader to be turned on or off, wherein the frequency used by the first wireless identifier readers and the frequency used by the second wireless identifier readers are different.

* * * * *